Dec. 17, 1935.  J. G. GROWER  2,024,284
APPARATUS FOR MAKING LEATHER SUBSTITUTES
Filed May 17, 1933  2 Sheets-Sheet 1
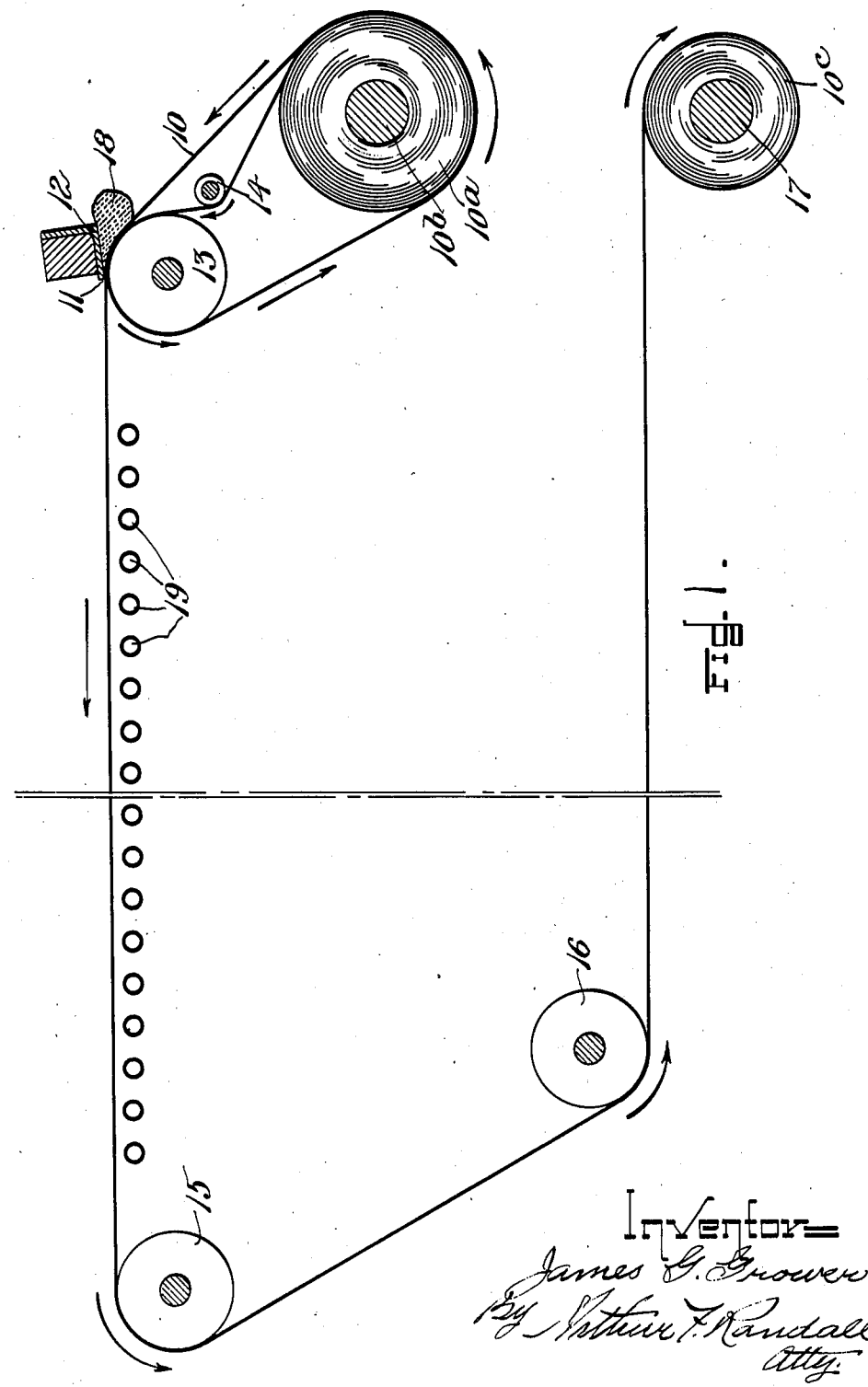

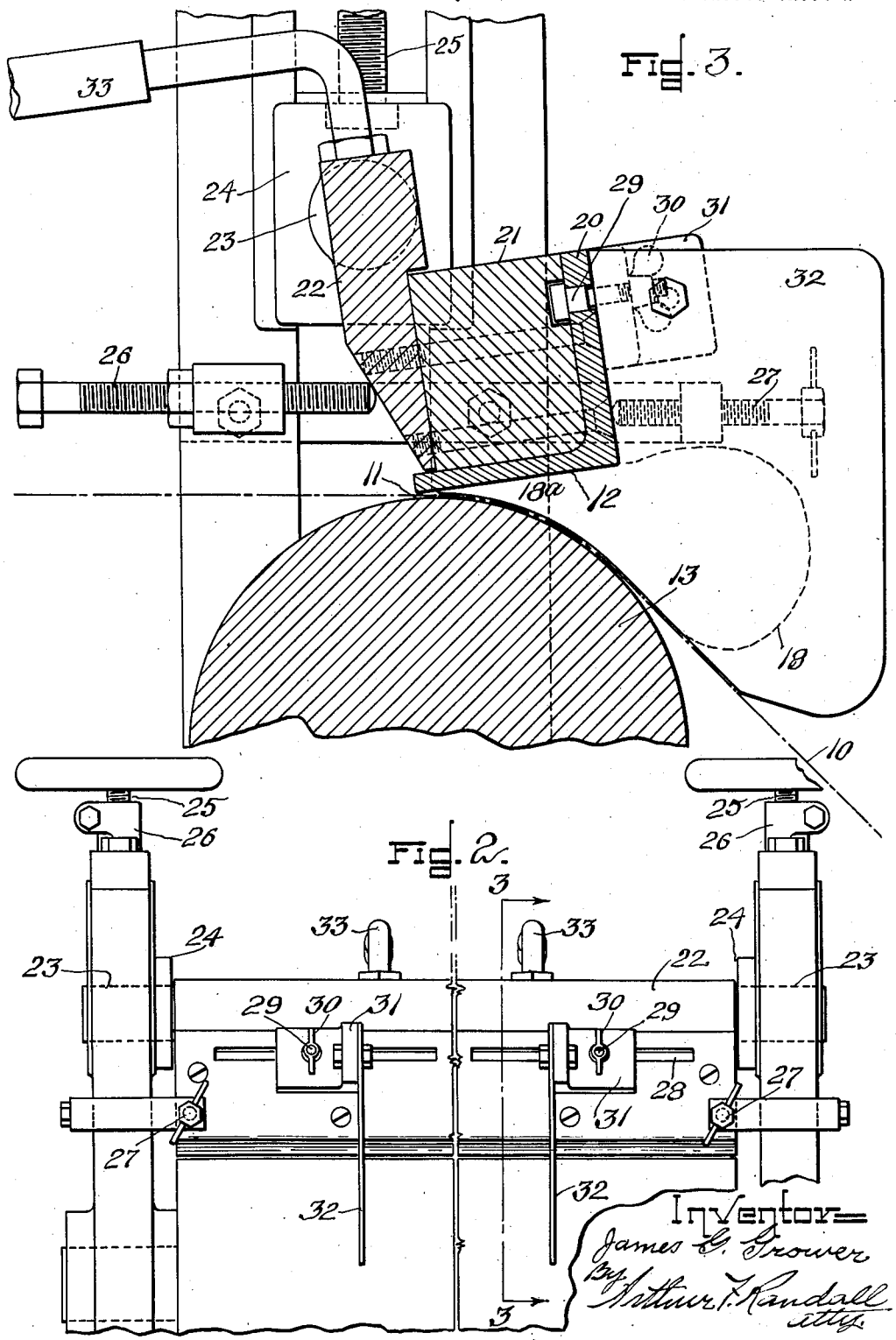

Patented Dec. 17, 1935

2,024,284

UNITED STATES PATENT OFFICE 2,024,284

APPARATUS FOR MAKING LEATHER SUBSTITUTES

James G. Grower, Watertown, Mass.

Application May 17, 1933, Serial No. 671,452

1 Claim. (Cl. 91—53)

This invention relates to apparatus for making leather substitutes and its has for its object the commercial production of a leather substitute web of considerable length, fair breadth and little thickness, one side of which at least will have the appearance of leather and which, among other things, shall be particularly adapted for use as a leather substitute in the manufacture of boots and shoes.

Goods of the class to which my invention relates have heretofore been produced by the employment of a base web of villous sheet material such, for example, as a napped textile fabric. This villous base material, wound upon a core into the form of a roll, was placed in a machine similar to a doubling or facing machine having two pressure rolls which were driven at the same speed.

As the villous base material was unwound from this roll under tension and passed between said rolls it was saturated with an adhesive agent which was pressed into the base material by the rolls while maintained in a more or less viscous condition by a solvent forming part thereof.

After leaving the presser rolls the coated and impregnated or saturated web was subjected to a drying treatment by which the solvent was removed from the structure.

Thereafter the dried and impregnated or saturated web was again passed between a pair of rolls and pressed while under tension to lay down the adhesive-filmed fibers of the nap to form a matted surface upon the impregnated inner structure of the web, and it was necessary to regulate the amount of tension or pressure in order to accomplish this purpose. This application of pressure while under tension served also to obscure the appearance of the weave of the base material when a woven fabric was used for the latter.

During the first saturating or impregnating step the nap fibers were pressed against the body of the fabric but since they adhered to the sticky pressure-applying surface, the fibers were pulled out from the body of the fabric as the latter left the first pair of presser rolls thus preventing the formation of a solid homogeneous mass. That is, upon leaving the first pair of impregnating rolls the nap fibers filmed with adhesive stood out by reason of the fact that the rolls by means of which the adhesive agent was forced entirely through the base material were covered with adhesive, and by reason thereof drew up the adhesive-filmed nap fibers before these fibers could detach themselves from the sticky cylinders. It was therefore necessary after drying to subject the material to pressure while under tension to lay down the adhesive-filmed fibers of the nap that were raised during the impregnating operation. The final step of pressing the impregnated and dried base material while under tension served to change the appearance of the napped fabric so that it assumed that of undressed leather.

In some cases the fabric, produced as above described, was treated with a surface dressing of one or more coats and thereafter, if desired, it was embossed with a design by means of a plate or roller press.

My invention aims to simplify and improve the method of and means for producing a leather substitute of this class and the distinguishing feature thereof is that I omit the operation of pressing while under tension after drying or removal of the solvent and this is made possible by the novel manner in which the villous base material is impregnated with the adhesive agent whereby I avoid raising the fibers of the nap as the impregnated material leaves the impregnating mechanism, supplemented, if desired, by the novel manner in which I may apply one or more finishing coats of adhesive agent to the impregnated villous material.

In the accompanying drawings:

Figure 1 is a diagrammatic view illustrating an apparatus embodying my invention.

Figure 2 is an elevation of a portion of one end of the apparatus illustrated in Figure 1.

Figure 3 is a section on line 3—3 of Figure 2.

In carrying out my invention I employ a web of villous sheet material 10 such as a napped textile fabric, which is drawn through a constricted passage or slot 11 existing between a wiper bar 12 and a rotatable cylindrical support herein shown as a roll 13, said roll being driven in the direction of the arrow, Fig. 1, and the bar 12 being held rigidly against web 10.

The web 10 may be supplied to the apparatus of Figure 1 in the form of a roll 10a wound upon a core or delivery roll 10b that is rotatably supported in the position shown.

From the roll 10a the web 10 is led under a guide roll 14 and thence around the roll 13 back again to roll 10a around which latter it travels back to roll 13, through constriction 11, and thence horizontally to and around a second roll 15. From roll 15 the web continues to and around a third roll 16 and thence to a core or take-up roll 17 on to which it is wound into a roll 10c.

When a roll 10a of villous sheet material is placed within the apparatus of Fig. 1 and its outer end has been passed around rolls 13, 15 and 16 as described, a bank of somewhat fluid or stiff viscous adhesive agent 18 is deposited upon web 10 immediately in front of the wiper bar 12 and the apparatus is started so that the web travels through the latter as indicated by the arrows.

The mechanism for driving the rolls 13, 15 and 16 and core 17 may be as usual in doubling or facing machines as heretofore provided.

The bottom of the wiper bar 12 is flat and disposed parallel with, and slightly separated from, a plane that is tangent to the surface of roll 13 with its rear straight edge nearest to the latter and approximately parallel with the axis of said roll 13. This provides an acute V-shaped compression space 18 in front of wiper bar 12 and roll 13 into which the body of adhesive agent 18 is drawn as shown in Fig. 1 owing to the tendency of said agent to adhere to, and move forward with, the web 10.

In this way the adhesive agent is crowded toward the apex of the V-shaped space to such extent that there is a forcible downward displacement of the adhesive agent into, and completely through, the web 10. At the same time the top villous surface of the web is saturated or impregnated with adhesive agent also, while the wiping action of the bar 12 lays the adhesive filmed fibers of the nap or a substantial portion thereof down longitudinally on to web 10 with the result that the top surface of the latter as it leaves wiper bar 12 is smooth and compact and its fibers are completely embedded within the adhesive agent.

As the saturated web 10 travels from bar 12 to roll 15 it passes above steam pipes 19 the heat from which dries the adhesive agent before the web passes around said roll 15. This application of heat drys the fabric by removing the solvent from the adhesive agent.

If desired one or more surface coatings of adhesive agent may be applied to the saturated and dried web although for some purposes the undressed fabric may be used as undressed leather is used in the arts. One or more coats of surface dressing may be applied to the fabric by passing it under the doctor knife of a coating machine. Finally, if desired, any required embossed design may be impressed on the coated fabric by a plate or roller press.

In the production of this leather substitute in some cases one adhesive agent may be used for impregnation of saturation of the web and another element for the surface dressing, or the same agent may be used throughout.

The adhesive agent 18 is preferably a rubber composition including naptha as a solvent which latter is removed by the application of heat from the steam pipes 19.

When the fabric produced by the apparatus of Fig. 1 is to be finished by depositing one or more coats of dressing, I preferably employ a rubber composition containing a solvent such as naptha and when this composition is applied the naptha ensures a complete union of the dressing coat with the previously dried adhesive agent of the web by wetting and softening the latter.

In applying the first coat of dressing I preferably employ a coating machine having a fixed doctor blade which is unusually thick so that it will have a wiping action instead of a scraping action as heretofore, and which is associated with a complementary roll after the fashion of the spreader bar 12 of Fig. 3, but which may be narrower than the latter. After this initial coating additional coats may be applied by using coating machines having ordinary comparatively thin doctor blades.

The purpose of using a wiping doctor blade of unusual thickness resembling the wiper bar 12 of Fig. 1 when applying the first coat of dressing, is to drive or wipe the solvent and other materials of the dressing into the surface or top portion of the previously dried adhesive agent of the web so as to wet and soften the same and thereby effect a union of the two layers.

Finally the completed fabric is dusted with cornstarch, potato starch, talc or the like, to render it non-adhesive until it is vulcanized. This vulcanization may be carried out in any well known manner, as by washing the coated fabric with sulphur chloride.

The wiper bar 12 as herein shown is a metal angle iron 20 which may have four inch flanges and upon the rear side of which is fitted a bar of wood 21 of the same length as the angle iron, and these parts are fastened together and to a normally fixed and rigid metal crosshead 22 which, as shown in Figure 2, is provided at its opposite ends with trunnions 23 mounted in boxes 24.

The boxes 24 are slidably mounted in vertical ways provided on the frame of the machine and to each is rotatably connected the lower end of a screw 25 which has threaded engagement with an interiorly threaded collar-like portion 26 on the frame of the machine.

The screws 25 are provided at their upper ends with hand wheels and it will be clear that by rotatively adjusting the screws the crosshead 22 and the parts carried by it may be adjusted vertically and set in the desired position relatively to roll 13. In practice these parts are set so that the rear edge of the wiper bar 12 is in contact with the top side of the web 10.

Mounted upon the frame of the machine are two adjustable abutment screws 26 and 27, the former being in engagement with the rear side of crosshead 22 and the latter in engagement with the front side of the angle iron 20. It will be clear that by means of these two adjustable abutments the angle of the flat bottom surface of wiper bar 12 relatively to roll 13 may be varied, but that normally the bar 12 is held rigidly in its adjusted position by the screws 25, 26 and 27.

The upstanding flange of the angle iron 20 is formed near each end thereof with a slot 28 to accommodate a T-bolt 29 provided with a thumb nut 30 by means of which a bracket 31 is fixedly clamped against the outer side of said flange with provision for adjustment longitudinally thereof.

Each bracket 31 has rigidly fastened to it a vertical sheet metal wall 32 formed so as to fit against the outer sides of both flanges of the angle iron. The side walls 32 are positioned adjacent to the opposite side edges of the web 10 and serve to hold the adhesive agent in position upon said web as the web passes between wiper bar 12 and roll 13.

If desired the crosshead 22 may be provided with handles 33 for use in adjusting said crosshead angularly.

What I claim is:

In a machine of the character described the combination with a rotatable abutment roll around which napped sheet material that is to be saturated is drawn and stretched so as to open the pores and separate the surface fibers of the nap thereof upon its exposed side, of a rigid wiper bar element disposed parallel with and directly opposite said roll and having a broad surface that is disposed approximately parallel with respect to a plane tangent to said roll with its rear edge in contact with the portion of said sheet material that is stretched around said roll so as to provide an acute angular space between said portion and said bar for holding a bank of stiff viscous binding agent that is supported by the arcuate portion of said sheet material that is in front of said wiper bar element and within said angular space, said wiper bar element being pivotally mounted on a supporting frame and serving to progressively force the binding agent into and through said arcuate portion of the sheet material as said portion travels around said roll toward said wiper bar element, and adjustable abutments for normally locking said element against movement on its pivot but with provision for adjustment toward and from said roll.

JAMES G. GROWER.